Feb. 29, 1972   KENJI UEDA   3,645,880

ELECTRODE APPARATUS FOR BRINE ELECTROLYSIS

Filed May 14, 1970   3 Sheets-Sheet 1

INVENTOR
KENJI UEDA

BY *Oblon, Fisher & Spivak*

ATTORNEYS

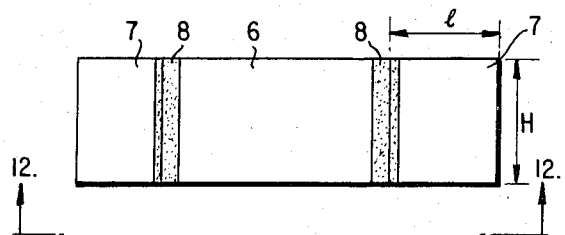
FIG. 11
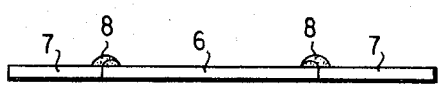
FIG. 12
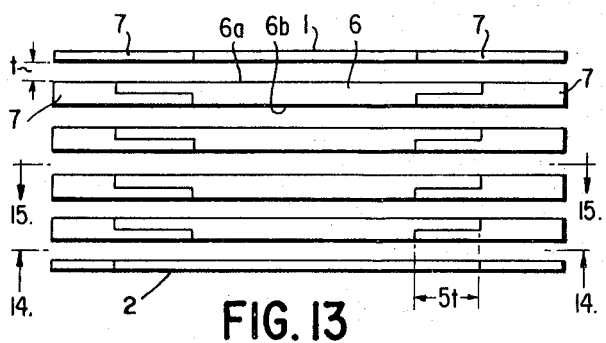
FIG. 13
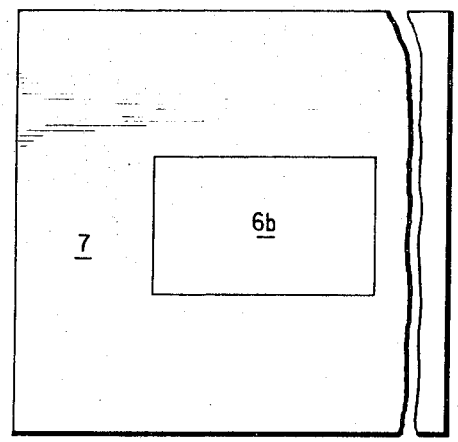
FIG. 14
FIG. 15
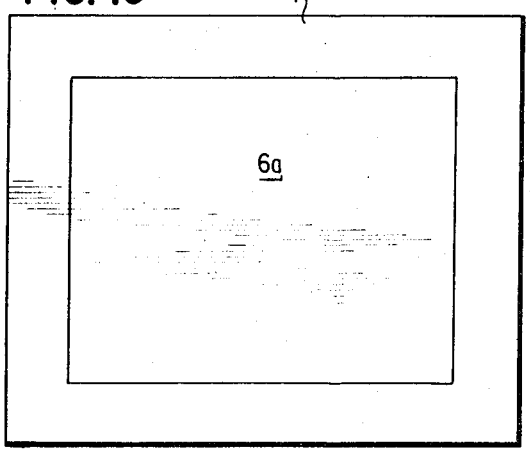
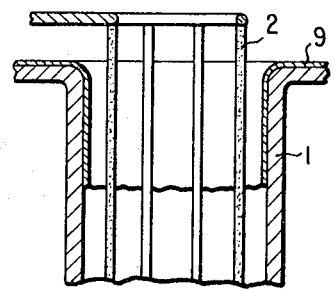
FIG. 16
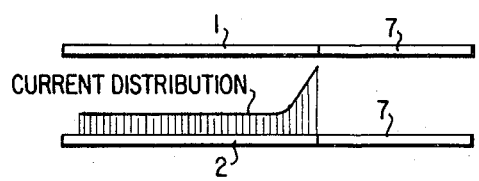
FIG. 17
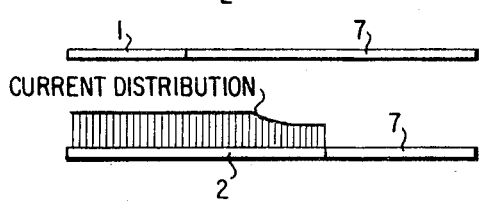
FIG. 18

United States Patent Office 3,645,880
Patented Feb. 29, 1972

3,645,880
ELECTRODE APPARATUS FOR BRINE ELECTROLYSIS
Kenji Ueda, Nagasaki, Japan, assignor to Mitsubishi Jukogyo Kabushiki Kaisha, Tokyo, Japan
Filed May 14, 1970, Ser. No. 37,160
Claims priority, application Japan, May 14, 1969, 44/37,256
Int. Cl. B01k 3/04
U.S. Cl. 204—278
9 Claims

ABSTRACT OF THE DISCLOSURE

An apparatus for electrolyzing brine, or seawater, characterized by a cathode edge projection from the edge of a parallel and opposite insoluble anode which is substantially five times greater than the distance between these electrodes. The apparatus is immersed in a brine conducting passageway and current is applied thereto for permitting electrolysis of the brine during continuous operation thereof, with little or no precipitative deposit on the electrodes, and thereby providing uninterrupted flow of the brine through the passageway and the electrode apparatus for preventing marine growth on parts contacted by the brine.

BACKGROUND OF THE INVENTION

This invention relates generally to electrolytic cells and more particularly to an improved electrode apparatus which effectively prevents the adhesion of marine growth to parts immersed in brine, or seawater, by means of electrolysis products obtained during the continuous electrolysis of the brine over a long period of time.

It is well recognized that many problems are ordinarily caused by marine growth adhering to parts which normally are maintained in contacting relationship with brine, or seawater, such as, for example, a brine introducing duct of a ship or a steam power station, the draught part of a ship, a condenser which uses brine as a coolant, and the like. A common method for preventing the adhesion of marine growth to such parts involves the use of a large capacity electrolytic cell disposed in the same brine atmosphere as are the parts for the purpose of producing and releasing chlorine compounds therein.

Although this method enjoys wide use and is generally successful for its intended purpose, it has been found that it is not always entirely satisfactory, especially where continuous operation for a long period of time is required. It is well known, for example, that the current flowing between the electrodes of such cells usually is concentrated at the edges thereof and that, during electrolysis in seawater, a precipitate of magnesium hydroxide, $Mg(OH)_2$, is generated at the cathode which effectively reduces the flow rate of the brine, or seawater, passing between the electrodes. It has been found that in a part wherein the current density is flat, such as, for example, the central part of the electrode plate, magnesium hydroxide precipitates constantly in equilibrium, having some relation with the time, as well as the current density and the flow rate of the brine whereby, for example, when the flow rate is large, the thickness of the magnesium hydroxide deposition is small. Also the current remarkedly concentrates at the edge of the cathode plate, as herein above discussed, and the deposition of the magnesium hydroxide at the edges generally is several times as thick as in the flat, or central, part of the electrode plate.

Accordingly, if the flow rate of brine passing between the electrodes is reduced by this deposition of the magnesium hydroxide at the edge part thereof, the flow of brine in the flat, or central, part is also inhibited, and the thickness of the deposition in this part also is increased. If such a phenomenon once occurs and progresses, the flow between the electrodes becomes rapidly clogged and consequently the electrolytic cell cannot be operated continuously.

SUMMARY OF THE INVENTION

Accordingly, it is an object of the present invention to provide an improved electrode apparatus for use in electrolyzing brine, or seawater, which may be operated continuously for a long period of time.

Another object of the present invention is to provide an improved electrode apparatus for electrolyzing brine, or seawater, which may be operated continuously for a long period of time with little or no precipitative deposition on the electrodes.

Still another object of this invention is to provide an improved electrode apparatus for preventing marine growth on parts contacted by a brine, or seawater electrolyte which is small in size and highly efficient, and capable of a stable and prolonged operation without inhibiting the flow rate of the brine between the electrodes.

The foregoing and other objects are attained by an electrolytic cell for electrolyzing brine by applying current between an insoluble anode and a cathode which are immersed in the brine, characterized by the projection of an edge part of the cathode from the edge of the parallel and oppositely disposed anode by more than five times the distance separating these electrodes. This projection of the electroconductive edge of the cathode from the edge of the opposite anode equalizes the current distribution on the cathode and thereby reduces any precipitative deposition on the cathode which normally restricts the flow of the seawater electrolyte through the cell.

BRIEF DESCRIPTION OF THE DRAWING(S)

Other objects and many of the attendant features and advantages of the present invention will be readily appreciated as the same becomes better understood from the following detailed description when considered in connection with the accompanying drawings wherein like or corresponding parts are designated by like reference characters and in which:

FIG. 11 is a plan view showing the precipitation of magnesium hydroxide, $Mg(OH)_2$, at the electrode with an insulating fin;

FIG. 12 is a side view taken along the line 12—12 in FIG. 11;

FIG. 13 is a plan view showing the arrangement of the electrodes in a serially connected electrolytic cell and constructed in accordance with the present invnetion;

FIG. 14 is a side view of the apparatus shown in FIG. 13 taken along the line 14—14 therein;

FIG. 15 is a side view of the apparatus illustrated in FIG. 13 taken along the line 15—15 therein;

FIG. 16 is a longitudinal sectional view of another embodiment of the present invention in a cylindrical type electrolytic cell;

FIGS. 17 and 18 are comparative charts and show, respectively, the distribution of the current in an ordinary electrode and in an electrode constructed according to the present invention;

Figure 19:
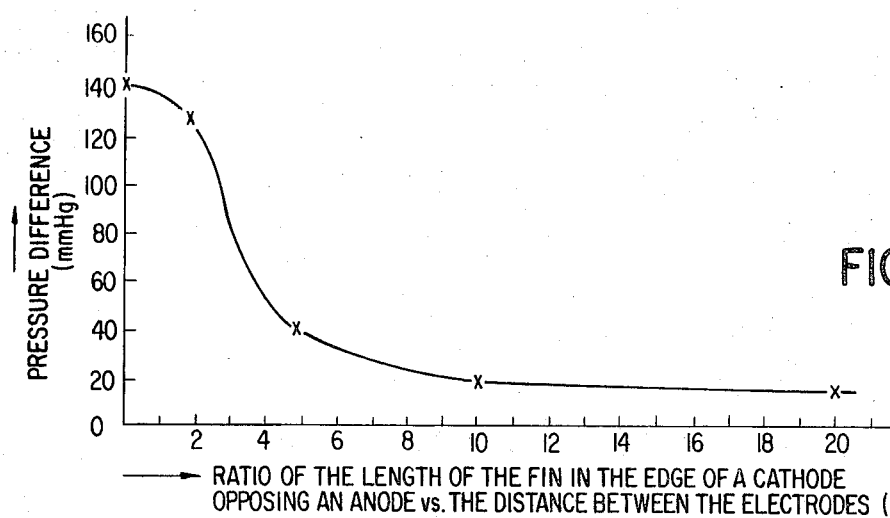
Figure 20:
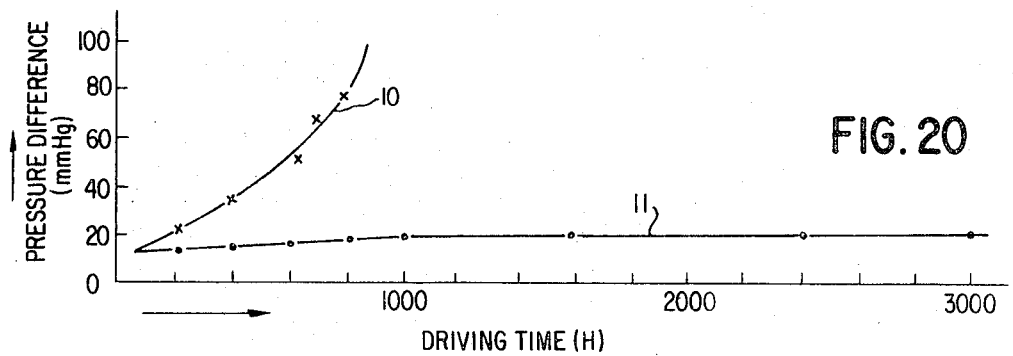
Figure 21:
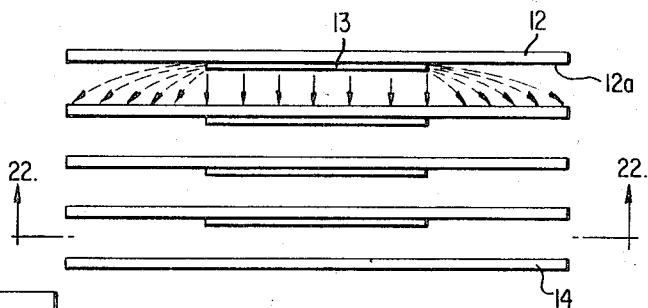
Figure 22:
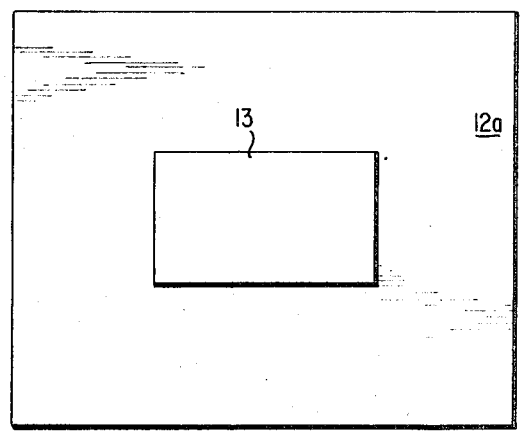

FIG. 19 is a graph showing the static pressure difference between the inlet and the outlet of an electrolytic cell, with a varying ratio of the length of the fin (B) along the edge of a cathode opposing an anode versus the distance (A) separating the electrodes, when brine is electrolyzed in a parallel plate type electrolytic cell provided with the electrode apparatus of the present invention in series connection;

FIG. 20 is a graph showing the static pressure difference between the inlet and the output of an electrode apparatus having the ratio of the length (B) of the projection in the cathode plate opposing the anode plate versus the distance (A) separating the electrode plates being 10 in that of an ordinary apparatus having a ratio of 0;

FIG. 21 is a plan view showing another embodiment of the electrode apparatus of the present invention; and FIG. 22 is a side view of the embodiment illustrated in FIG. 21 taken along the arrow 22—22 therein.

DESCRIPTION OF THE ILLUSTRATED EMBODIMENTS

Figure 1:
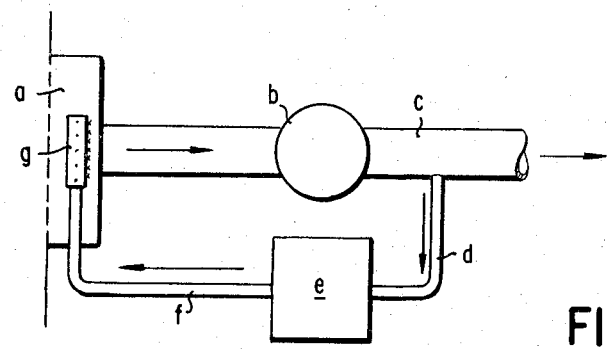
FIG. 1 is a schematic diagram showing a typical connection of an electrolytic cell in a system for preventing adhesion of marine growth to parts therein.

Referring now to FIG. 1, there is shown a typical arrangement of an electrolytic cell in a system for preventing adhesion of marine growth on parts therein which normally contact the brine, or seawater, wherein the brine is drawn through an inlet $a$ by a brine pump $b$ and introduced to the system through a brine channel $c$, and a brine introduction channel $d$ is designed to divert part of the brine from the channel $c$ to an electrolytic cell $e$ of large capacity. An electrolytic product consisting of chlorine compounds is formed in the cell $e$ and is directed therefrom through a chlorine-containing brine channel $f$ to a nozzle $g$ disposed adjacent the brine inlet $a$ for distribution therein, whereby the part which must be kept free of adhering marine growth is placed in an atmosphere of the chlorine-containing electrolytic product for accomplishing this purpose.

Figure 2:
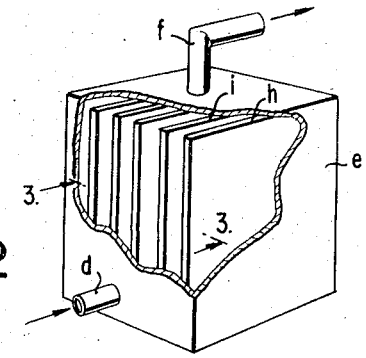
FIG. 2 is a perspective view, partly in section, of a conventional parallel plate type electrolytic cell.
Figure 3:
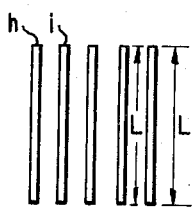
FIG. 3 is a side view of FIG. 2 taken along the line 3—3 therein.
Figure 4:
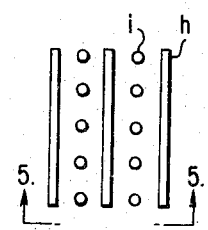
FIG. 4 is a plan view of a conventional parallel plate bar type electrolytic cell.
Figure 5:
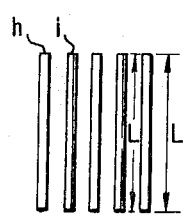
FIG. 5 is a side view of the device illustrated in FIG. 4 taken along the line 5—5 therein.
Figure 6:
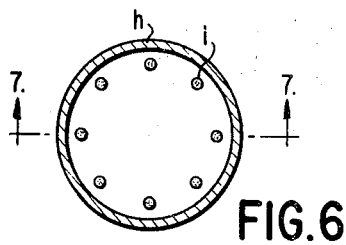
FIG. 6 is a horizontal sectional view of a conventional cylindrical type electrolytic cell.
Figure 7:
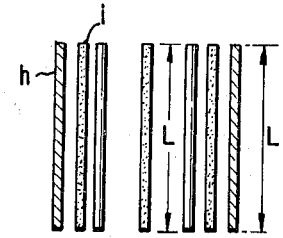
FIG. 7 is a side view, in longitudinal section, of the device illustrated in FIG. 6, taken along the line 7—7 therein.

The typical electrolytic cell $e$ usually comprises a parallel plate type, such as shown in FIGS. 2 and 3, a parallel plate bar type, such as shown in FIGS. 4 and 5, or a cylindrical type, as shown in FIGS. 6 and 7, all of which are conventional and well known in the art. In the ordinary parallel plate type, the anode $h$ and the cathode $i$ are of the same shape and size, and in both the parallel plate bar type and the cylindrical type, heretofore known, the length of the anode $h$ is the same as that of the cathode L.

The current flowing between these electrodes of the prior art is usually concentrated at the edge portions thereof according to the aforementioned edge effect, which results in the precipitation of magnesium hydroxide, $$Mg(OH)_2$$

at the cathode during electrolysis of brine with each of the previously known electrolytic cells. Accordingly, magnesium hydroxide, $Mg(OH)_2$, is deposited about the edge of the cathode plate to a greater degree than such deposition occurs in the flat, or central part, of the electrode plate and the flow rate of the brine, or seawater, passing between the electrodes is thereby reduced. The flow of brine in the flat part is also inhibited, and the thickness of the magnesium hydroxide deposition in this part thus also becomes greater. This occurrence causes the flow between the electrodes to be rapidly clogged and consequently the electrolytic cells heretofore used for this purpose cannot be operated continuously for a long period of time.

Thus, the parallel plate type electrolytic cell, although having such merits as being of small size and of good efficiency, is unreliable for long term, constant operation. The parallel plate bar type and the cylindrical type can be advantageously operated more constantly for a longer period of time, when compared to the parallel plate type, but they are not yet satisfactory and are of larger size.

Figure 8:
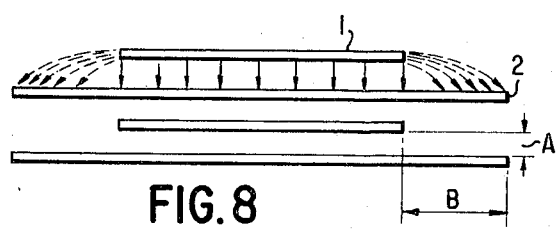
FIG. 8 is a plan view of an electrode apparatus constructed in accordance with the teachings of the present invention.

In the electrolytic cell of the present invention, illustrated in FIG. 8, which has the advantages of being small in size and highly efficient, which were possessed by the former parallel plate type electrolytic cells, but which does not share the disadvantage of becoming clogged because of precipitative deposition on the electrodes and thus can provide stable and prolonged operation, an insoluble anode 1, which may be constructed of such materials as magnetic iron oxide, platinum, lead-silver alloy or platinum plated titanium, and a cathode 2, which may be constructed of iron or nickel, are placed opposite each other in predetermined spaced relation, and the electroconductive edge portion of the cathode 2, is provided with a fin B which projects from the opposite of the edge of the anode 1 a distance substantially five or more times as long as the predetermined distance A separating the electrodes.

Figure 10:
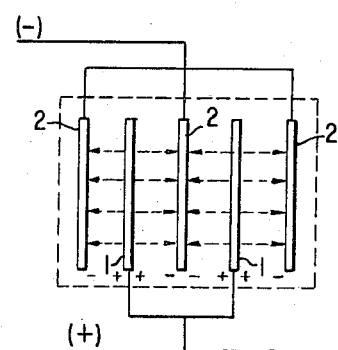
FIG. 10 shows a typical connection of the electrodes of an electrolytic cell in parallel relation.

A comparison will now be drawn between the present invention and the parallel plate type electrolytic cells of the prior art, shown in FIGS. 2 and 3. There are two ways of connecting a power source and the electrodes of a parallel plate type electrolytic cell, the serial connection thereof being shown in FIG. 9 and the parallel connection being shown in FIG. 10. Since low current and high voltage are desirable from the economic standpoint as to consideration of the power source, the electrodes are most often connected in series.

Figure 9:
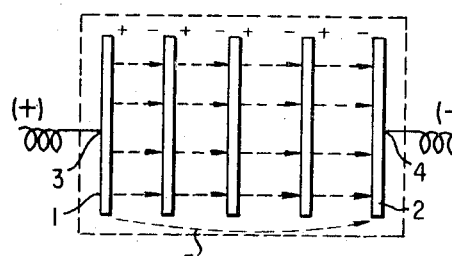
FIG. 9 shows a typical connection of the electrodes of an electrolytic cell in series relation.

In serial connection, as shown in FIG. 9, the voltage difference between the input terminal 3 and the output terminal 4 is quite large and results in a large by-pass, or stray, current. In addition, increase of the current has been found to have no relation with the results of the electrolysis procedure so far as causing a reduction of the current efficiency. According to a study and experimentation, the stray current may be represented by the following formulae:

$$I_{M1} = \frac{V}{8R}(N-1)^2, \text{ N being even}$$
$$I_{M2} = \frac{V}{8R}[(N-1)^2 - 1], \text{ N being odd} \quad \cdots \text{(I)}$$

wherein $I_{M1}$ and $I_{M2}$ = total of the stray current
V = potential difference between a pair of electrode plates
R = leak resistance in each electrode plate
N = number of electrode plates The stray current desirably should be decreased as much as possible, since it causes corrosion of pipes due to electrolytic corrosion. For this reason, as may be seen in FIGS. 11 and 12, an insulating fin 7 of such material as polyvinyl chloride or the like, is applied to either end of an electrode plate 6 to increase the leak resistance R and decrease $I_M$ in Formula I.

The size of the fin can be determined easily by calculation according to the following formulae derived from the above Formulae I:

$$I_{M1} = \frac{VHt}{4pl}(N-1)^2$$
$$I_{M2} = \frac{VHt}{4pl}[(N-1)^2-1]$$ ... (II)

wherein p: specific resistance of brine
l: length of the insulating fin
t: distance between the electrodes
H: width of the insulating fin The current efficiency in an electrolytic cell connected in series and consisting of the group of electrode plates having such structure as described above is very high, and when using an electrode consisting of platinum-plated titanium, for example, a current efficiency higher than 80% was obtained.

However, in the electrolytic cell having such a structure as seen in FIGS. 11 and 12, a deposit 8 of magnesium hydroxide is precipitated between the insulating fin 7 and the cathode side of an eletcrode plate 6 which inhibits the flow of the brine and causes a reduction of efficiency and clogging to preclude a stable and long-period operation.

When using the present invention in a serially connected electrolytic cell, therefore, as shown in FIG. 13 illustrating the performance of the present invention, the edge of the cathode side 6a of the electrode plate 6 opposing the anode 1 is allowed to proect beyond the edge of anode 1 more than five times, 5t, as far as the distance t between these electrodes, and the anode side 6b of the same plate is kept the same size as the above-described anode 1. Some electrode plates 6 thus prepared are placed in parallel, and a cathode 2 is ultimately positioned at the end of this parallel stack opposite the anode 1. Each end of the anode 1, the intermediate electrodes 6 and the cathode 2 is provided with an insulating fin 7, as seen in FIGS. 13, 14 and 15.

Very little of the stray current described above is yielded even in a parallel plate type electrolytic cell, when a parallel-connection system is used, so, for that electrode group in such an electrolytic cell, it is almost unnecessary to apply insulating fins, as seen in FIG. 8.

In the parallel plate bar type electrolytic cell and the cylindrical type, parallel-connections are generally employed. Thus, it is unnecessary to apply insulating fins, but is sufficient to make the edge part of a cathode longer than the edge part of an anode by more than 5 times the distance between the electrodes, as seen in FIG. 16. An insulating material may be applied to the anode 1, however, for realizing the above conditions.

The structure of the electrodes according to the present invention have been precisely described, and now there will be explained the reason why Mg(OH)₂ is not precipitated at the edge part of the cathode when the electrodes are composed as set forth herein.

FIG. 17 shows the current distribution in a conventional parallel plate type electrode. As seen in the figure, the current concentrates at the edge of the electrode so that the current density at this part becomes ∞ theoretically, whereby Mg(OH)₂ precipitates at the edge of the cathode. FIG. 18 shows the current distribution in the present invention. As seen in the figure, the current density becomes rather uniform by making the cathode edge longer than the anode edge, so that Mg(OH)₂ will not be caused to precipitate at the cathode edge.

Some examples of utilizing the apparatus of the present invention are shown hereinafter.

Example 1

In a parallel type electrolytic cell consisting of 10 electrode plates being 200 mm. x 1000 mm. in size and connected in series, and varying the ratio of the length B of the projection on the cathode edge opposing an anode with the distance A between the electrodes, brine was electrolyzed at a flow rate of 0.7 m./sec. and an electrolying current of 50 A. After 1000 hours, the difference of the static pressure between the inlet and the outlet of the cell was observed and the result is shown in FIG. 19. According to these results, this apparatus can be continuously operated when the difference of the static pressure between the inlet and the outlet is lower than 40 mm. Hg, which is the case so long as the ratio of the length B of the projection formed on the cathode edge opposing an anode with the distance A between the electrodes is more than 5. In accordance with the result thus obtained, it is evident that in the present invention, the edge of a cathode should project beyond the edge of an anode more than 5 times the distance separating the electrodes.

Example 2

Under the same conditions used in Example 1, the static pressure difference between the inlet and the outlet of an electrode apparatus having a ratio of the length B of the projection in the cathode plate opposing the anode plate to the distance A between the electrode plates of 10 and that of an ordinary apparatus wherein the ratio is zero were observed, and the results are shown in FIG. 20. In either case, the distance between the plates was maintained at 5 mm.

In this graph, the curve 10 shows the difference of the static pressure in the electrolytic cell using ordinary electrodes and the curve 11 shows the static pressure difference in the cell using the electrodes of the present invention. As may be observed therein, the difference of the static pressure between the inlet and the outlet of the electrolytic cell using ordinary electrodes was 40 mm. Hg after 500 hours operation which is a result of precipitates having become deposited between the electrodes, while in the electrolytic cell using the electrodes of the present invention, the said difference was about 20 mm. Hg after 3000 hours operation, because no clogging caused by precipitative deposition of Mg(OH)₂ occurred between the electrodes, thus assuring continuous prolonged operation.

Other examples shown in FIGS. 21 and 22 are explained.

In these examples, electrodes 12 of materials such as titanium and tantalum, which become inert in brine, or seawater, during electrolysis, are positioned so as to oppose each other, and to the center of the surface 12a which becomes inert in each electrode 12, an insoluble material 13, such as a platinum-plated material, platinum, lead-silver alloy or carbon, is attached with an adhesive having a high electric conductivity, for instance, Dotite A1 (a trade name, mixture of silver and an epoxy resin manufactured by Fujikura Kasei Co., Japan). Thus the edge of the electrode material which becomes inert is projected from the edge of the insoluble material by a distance more than 5 times as long as the distance between the electrodes. In such a case, titanium or tantalum can be used as a cathode 14 as it is.

In the electrode of titanium or tantalum, the surface 12a on which the current is applied in brine is covered with an inert film such as titanium oxide or tantalum oxide to inhibit the electric current. Therefore, the surface behaves as an insulator. On the contrary, when using it as the cathode, the electric current can sufficiently flow, though the hydrogen overvoltage is a little high.

Accordingly, when composing the electrodes as shown in FIGS. 21 and 22, the insulating fins shown in FIGS. 13–15 or those shown in FIG. 16 are not needed. Therefore, troublesome treatment such as bonding of an insulating fin to an electrode or applying an insulating material can be eliminated, and the apparatus can be prepared quite readily.

On electrolyzing, as shown in FIG. 1, a part of brine is introduced from the brine channel c to an electrolytic cell e through a brine introducing duct d, and the electrolytic cell may be provided with the electrode apparatus of the present invention shown in FIGS. 13-15. Thus, a chlorine gas generates from the insoluble anode 1, 6b and a hydrogen gas generates from the cathode 2, 6a, and the former dissolves in brine to afford chlorine compounds, which are introduced to the brine inlet a through the chlorine-containing brine duct f.

In the electrode apparatus according to the present invention as the edge of the cathode is projected beyond the edge of the opposite anode more than 5 times the distance between the electrodes, precipitation of $Mg(OH)_2$, which previously has been deposited at the edge of the cathode, is hardly observed, and consequently, clogging between the electrodes can be prevented. Thus, the electrolytic cell for brine can be advantageously operated constantly for a long period of time.

Particularly, adopting the electrode apparatus of the present invention to a serially connected parallel plate type electrolytic cell, the cell can be made compact and highly efficient.

Obviously, many modifications and variations of the present invention are possible in light of the above teachings. It is understood, therefore, that within the scope of the appended claims, the invention may be practiced otherwise than as specifically described.

What is claimed is:

1. An apparatus for electrolyzing brine characterized by applying current to an insoluble anode and a cathode which are immersed in the brine and positioned so as to oppose each other in predetermined spaced relation, the improvement comprising an electrode apparatus characterized by the electroconductive edge of said cathode projecting beyond the edge of said opposite anode at least 5 times as far as the distance separating said electrodes.

2. The apparatus set forth in claim 1 wherein said insoluble anode is composed of a material from the group consisting of magnetic iron oxide, platinum, a lead-silver alloy and platinum-plated titanium.

3. The apparatus set forth in claim 1 wherein said cathode is composed of iron.

4. The apparatus set forth in claim 1 wherein said cathode is composed of nickel.

5. An apparatus for electrolyzing brine characterized by applying current to at least a pair of spaced electrodes which are immersed in brine and positioned so as to oppose each other, the improvement comprising an electrode apparatus characterized by an electrode which is composed of a material which becomes inert in brine and has an insoluble material bonded to a central part of the inert surface, and the edge of the said inert material surface projecting beyond the edge of said insoluble material bonded thereto at least 5 times as far as the distance separating the same from the next adjacent electrode.

6. The apparatus set forth in claim 5 wherein said inert material is titanium.

7. The apparatus set forth in claim 5 wherein said inert material is tantalum.

8. The apparatus set forth in claim 5 wherein said insoluble material is one from a group consisting of platinum, a platinum-plated material, a lead-silver alloy and carbon.

9. The apparatus set forth in claim 5 wherein said insoluble material is bonded to said inert material electrode with a highly electrically conductive adhesive.

References Cited
UNITED STATES PATENTS

| | | | |
|---|---|---|---|
| 3,458,414 | 7/1969 | Crane et al. | 204—149 |
| 3,530,051 | 9/1970 | Ueda et al. | 204—149 |

JOHN H. MACK, Primary Examiner

W. I. SOLOMON, Assistant Examiner

U.S. Cl. X.R.

204—258, 270